United States Patent [19]

Rennie et al.

[11] 4,198,631
[45] Apr. 15, 1980

[54] APPARATUS FOR DISPLAYING VHF-DIRECTION FINDER DATA ON A RADAR PPI

[75] Inventors: James C. Rennie; Philip M. Thompson; Vernon I. Davies, all of Ottawa, Canada

[73] Assignee: Canadian Patents & Development Limited, Ottawa, Canada

[21] Appl. No.: 953,935

[22] Filed: Oct. 23, 1978

[51] Int. Cl.$^2$ .......................... G01S 9/02; H01J 29/78
[52] U.S. Cl. .................................. 343/5 EM; 315/378; 315/386; 343/112 TC
[58] Field of Search ............ 315/378, 386; 343/5 EM, 343/112 TC

[56] References Cited

U.S. PATENT DOCUMENTS

| | | | |
|---|---|---|---|
| 3,188,631 | 6/1965 | Birtley | 343/5 EM |
| 3,717,872 | 2/1973 | Snook et al. | 343/5 EM |
| 3,789,403 | 1/1974 | Dalena et al. | 343/5 EM |
| 3,821,735 | 6/1974 | Lasoff et al. | 343/5 EM |
| 3,881,176 | 4/1975 | Scheer | 343/5 EM |
| 4,128,834 | 12/1978 | Katagi | 343/5 EM |

*Primary Examiner*—S. C. Buczinski
*Attorney, Agent, or Firm*—Edward Rymek

[57] ABSTRACT

The apparatus generates a train of pulse signals in real time which are fed to a Plan Position Indicator radar display video bright-up circuit. A line is formed on the display at a bearing $\theta_R$, the direction of a VHF/DF fix, and passes through a point having the coordinates $R_o$, $\angle\theta_o°$, the position of the VHF/DF receiver, with respect to the center of the plan position indicator rotating radial scan. The radial scan operates at a radar trigger pulse repetition frequency F and rotates at a frequency f to subtend an angle $\Delta\theta = 360° \times f/F$ per scan. The apparatus includes an up-counter for storing a count of $R_o \sin(\theta_R - \theta_o)$, and a down-counter coupled to the up-counter and enabled at the pulse repetition frequency F to receive the count from the up-counter. The down-counter is adapted to provide an output pulse signal to the video bright-up circuit when its count reaches 0. A binary rate arithmetic multiplier has a first input which receives clock pulses at a frequency $f_c >> F$ and a second input which receives a digital binary signal that is a function of the radar pointing angle $\theta$ of the radial scan. The multiplier thereby provides a series of timed output pulses to the down-counter such that the down-counter counts down to 0 and triggers the video bright up circuit.

4 Claims, 7 Drawing Figures

APPARATUS FOR DISPLAYING VHF-DIRECTION FINDER DATA ON A RADAR PPI

BACKGROUND OF THE INVENTION

This invention is directed to apparatus for displaying the position of vessels at sea and in particular to apparatus for controlling the display of data from a VHF direction finder on a conventional marine radar plan-position indicator (PPI).

Both radar and VHF direction finding have long been tools for fixing the position of vessels at sea from shore stations. The types of information supplied by these two systems are different. Whereas radar can accurately locate the position of a vessel with relation to shoreline features and other vessels, it does not provide a means for positive identification of vessels not carrying radar transponders. If there are two or more VHF direction finders in use, the position of a vessel can be determined while it is transmitting with its VHF communication equipment. Also, the vessel can be identified, if its transmissions are properly identified.

These techniques can complement one another, if the output of the systems can be correlated. Although this can be done on a plotting table, there is little time for this in a busy Vessel Traffic Management Centre and it is preferable to display the VHF/DF information directly on the radar display. Once this is done, VHF/DF can be used to extend the radar to areas where its coverage is poor or where signals are submerged in sea clutter, to bring an operator's attention to a vessel he might have otherwise missed.

The VHF/DF information is commonly indicated by numerically displaying the transmitter bearing, or, by having a distinctive symbol or a pointing vector appear on the display. The distinctive symbol is most commonly used in synthesized display systems and can consist of a cross, rectangle, circle or other symbol, while the pointing vector is a simple radial from the origin of the PPI, which terminates at the triangulated transmitter position. The latter is the easier to realize on a conventional radar PPI. However both suffer from the disadvantage that an error in either of the two VHF/DF bearings results in an error in the total display. Furthermore, if, say, the local VHF/DF were unserviceable, there would be no display at all.

SUMMARY OF THE INVENTION

It is therefore an object of this invention to provide apparatus for displaying VHF/DF vectors directly on the PPI.

It is a further object of this invention to provide apparatus for converting remote VHF/DF bearing information to a synchronized train of pulses for combination with the PPI video signal to form a line on the display at a predetermined bearing $\theta_R$ through a point having the coordinates $R_o \angle \theta°_o$.

These and other objects are achieved in apparatus which includes a first counter for storing a count of $R_o \sin(\theta_R - \theta_o)$, a second counter coupled to the first counter and enabled at a pulse repetition frequency F to receive the count from the first counter, the second counter providing an output signal for the video bright-up circuit after stepping through the count. A binary rate arithmetic multiplier has a first input for receiving clock pulses at a frequency $f_c >> F$ and a second input for receiving a digital binary signal which is a function of the radar pointing angle $\theta$ of the radial scan, the multiplier providing a timed series of output pulses to the first counter such that the first counter steps through the count. The first counter may be an up-counter and the second counter may be a down-counter.

The apparatus further includes a read-only memory for storing the digital binary signal which is a function of the radar pointing angle $\theta$ in the form $\sin(\theta_R - \theta)$, and a second down-counter for storing the count $R_o$, the second down-counter is enabled during the period that $\theta_o = \theta$ and has an input for receiving clock pulses at the frequency $f_c$ for disabling the first up-counter when its count is zero thereby providing the count $R_o \sin(\theta_R - \theta_o)$ to the first up-counter.

DESCRIPTION OF THE PREFERRED EMBODIMENTS

Figure 1:
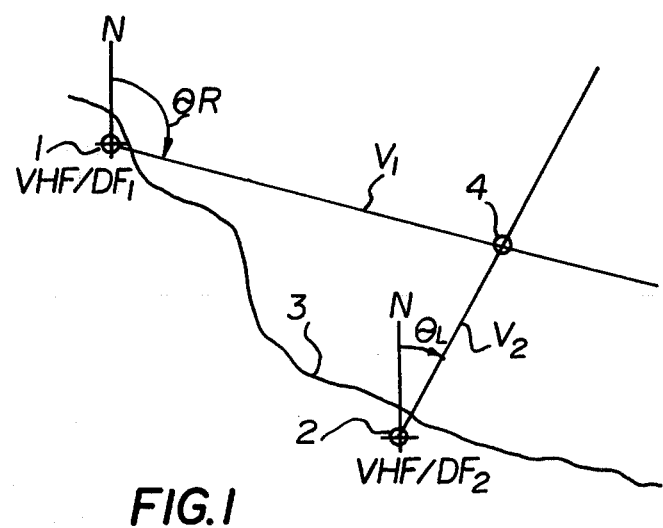
FIG. 1 illustrates a typical traffic management situation.

A typical traffic management situation is illustrated in FIG. 1. Two VHF direction finding stations 1 and 2 are shown along a coastline 3. The description and operation of a conventional VHF direction finder apparatus is described in the "Instruction Manual for VHF Direction Finder System Servoflight Model 7010 published by Servo Corporation of America, 111 New South Road, Hicksville, New York 11802, U.S.A. Each VHF/DF receives the VHF transmission from a vessel 4 and determines the vessel's bearings $\theta_R$ and $\theta_L$ with respect to each of the VHF/DF stations 1 and 2 respectively. The bearing data is usually in the form of binary code decimal or simply in binary codes for transmission to a traffic management center where it may be numerically displayed. In addition, vectors $V_1$ and $V_2$ can be drawn from stations 1 and 2, on a map at a plotting table. The intersection of vectors $V_1$ and $V_2$ marks the position of the transmitting vessel 4.

Additionally, in the typical traffic management situation, a conventional radar system is used to display the coastline and vessel traffic in the vicinity. The radar station is located on the coastline and would normally be located at a VHF station such as at 2. Conventional radar systems are described in the publication "Radar Handbook", Merril I. Skolnik; McGraw-Hill Book Company. In typical marine radar system, the transmitter emits a narrow beam of energy pulses typically at rates of 850 or 1700 pulses per sec. and the antenna rotates at 20 r.p.m. The pulses have a width in the order of 0.1 $\mu$s. The system also includes a plan-position indicator 5 (PPI) shown in FIG. 2. The PPI's rotating scan is synchronized to the antenna rotation and its radial sweep is synchronized to the radar trigger pulses such that when the antenna picks up the returned radar pulse, the antenna signal is coupled to the video bright-up control for displaying the target range and bearing.

Figure 3:
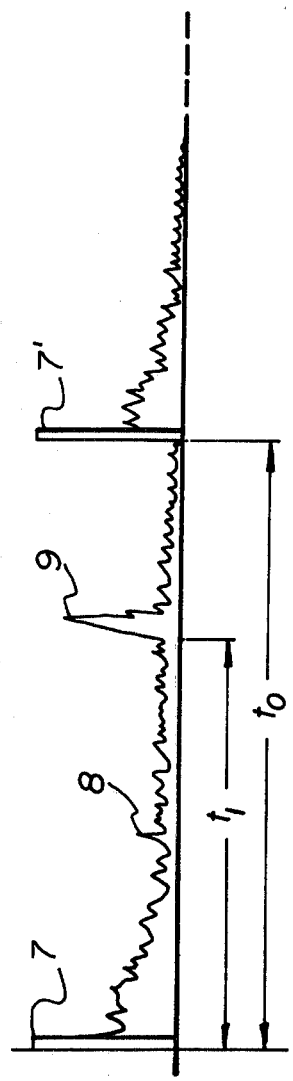
FIG. 3 shows a segment of the PPI video signal.

An example of a segment of the signal applied to the PPI video bright-up control is shown in FIG. 3. The radar is triggered by trigger pulses 7 (7') and transmits a pulse in a known direction. The signal 8 received by the radar antenna is applied to the PPI video control. It consists generally of noise, however if a vessel lies in the path of the outgoing pulse, the pulse is reflected back to the antenna and is picked up as pulse 9. The time of travel $t_1$ provides the range information since the radial scan of the PPI is triggered by the radar trigger pulse 7. The pulse repetition period is shown as $t_0$ during which time the antenna rotates a small angle in azimuth.

Figure 2:
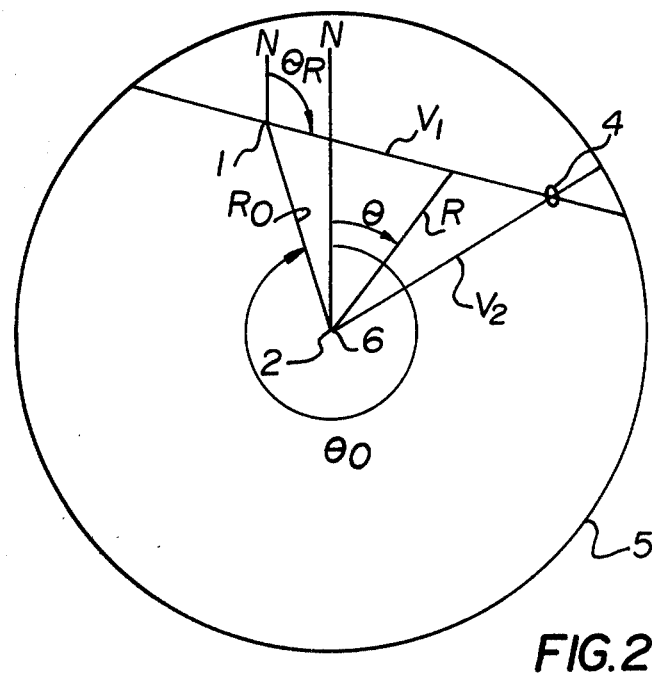
FIG. 2 illustrates the face fo a plan position indicator display.
Figure 4:
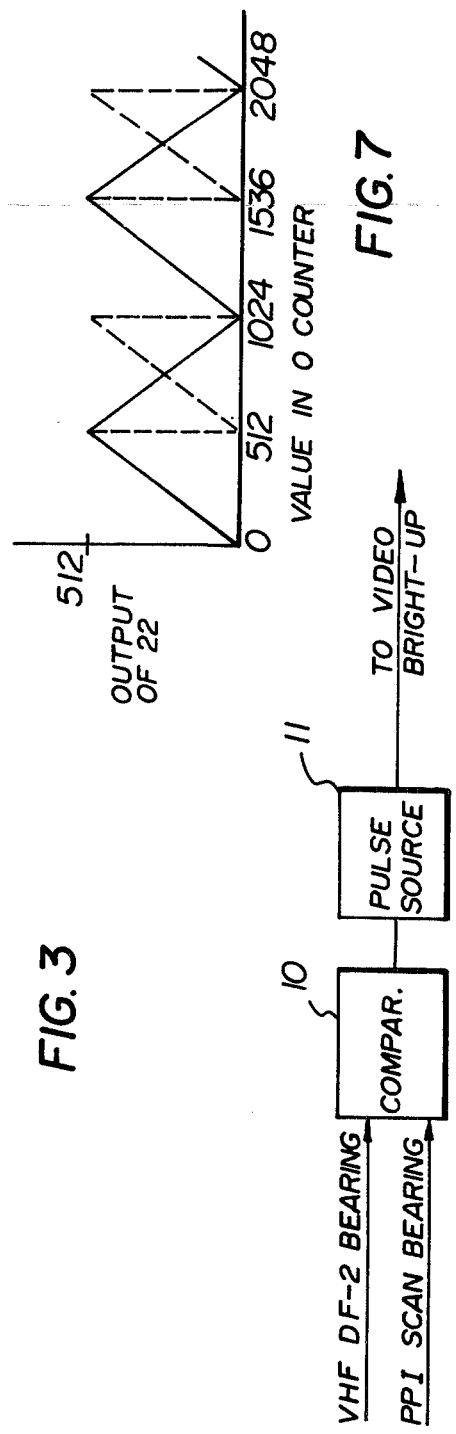
FIG. 4 illustrates a circuit for providing a video signal to the PPI for generating a line through the center.

As shown in FIG. 2, a local VHF/DF, 2, may be co-located with the radar such that the direction indicating line $V_2$ would originate at the center 6 of the PPI display 5 as shown in FIG. 2. In order to display a line $V_2$ on the PPI, the bearing $\theta_L$ data is fed to a comparator 10 as shown in FIG. 4, where it is compared to the bearing data of the rotating scan of the PPI 5. When the two bearings coincide, pulse source 11 provides a pulse to the video bright-up control in the PPI 5. The pulse would have a duration of $t_0$, the period for emitting radar pulses such that the PPI displays a vector along the coincident bearing.

The second or any other VHF-direction finder would not be located at the radar location, but would be located at a known position with respect to it, i.e. at some known distance $R_o$ from the radar center 6 and at a known bearing $\theta_o$. The bearing of a VHF transmitting vessel 4 is $\theta_R$ with respect to the VHF/DF 1 location. To display the position of the vessel 4 on PPI 5, a vector $V_1$ is displayed and the vessel is situated where vector $V_1$ crosses vector $V_2$. $V_1$ is formed from a series of bright dots on the PPI screen which are made by providing a bright-up pulse to the PPI video control at the proper time during each period $t_o$ for each bearing as the PPI radial scan rotates.

For each radar pointing angle $\theta$, range R—the distance to the vector $V_1$ from center 6 is determined from the expression $$R = R_o \frac{\sin(\theta_R - \theta_o)}{\sin(\theta_R - \theta)}$$

where
$R_o$ = fixed distance from station 2 to station 1
$\theta_o$ = fixed bearing of station 2 with respect to station 1
$\theta_R$ = detected bearing of the transmitting vessel with respect to station 1
$\theta$ = varying radar pointing angle.

Figure 5:
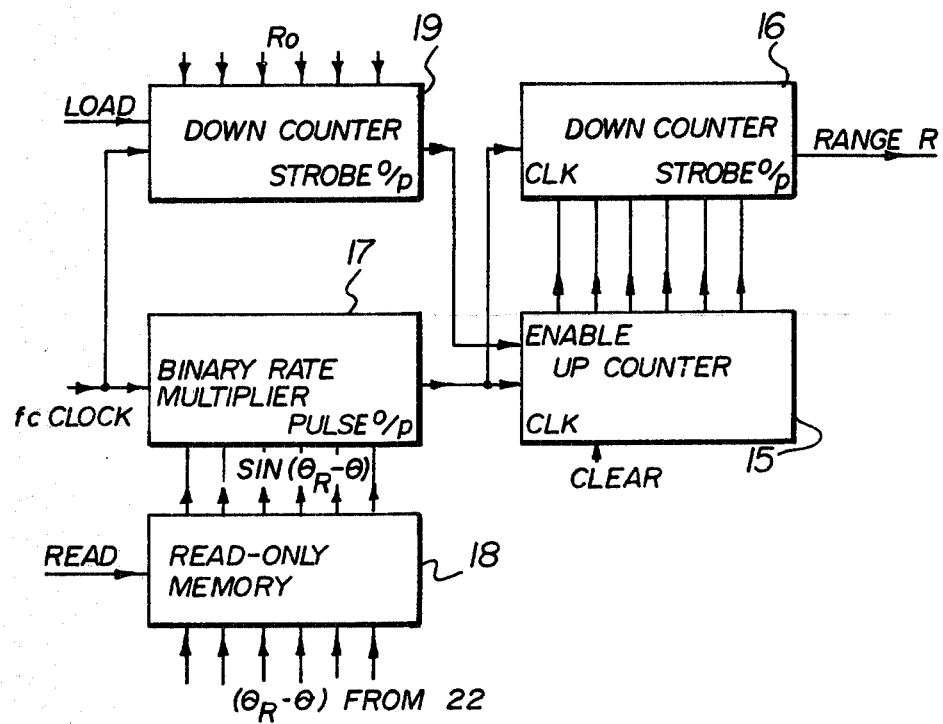
FIG. 5 illustrates a circuit in accordance with the present invention for providing a video signal for generating a line on the PPI display which passes through a point $R_o \angle \theta°_o$ with a bearing of $\theta_R$.

The apparatus for determining R in real time and for providing the bright-up pulse to the PPI video control is shown in FIG. 5. Using rate arithmetic, R is determined in the time between the radar trigger 7 in FIG. 3 and the required bright-up pulse 9. $R_o$ in the above expression, is represented by a number of pulses which are generated by a clock at a fixed frequency $f_c$ which is much greater than the pulse repetition frequency of the radar and which may be in the order of 10 MHz. The number of pulses $R_o$ will be equal to the clock frequency $f_c$ times the time it takes the radial scan to reach the range $R_o$ on the PPI at the bearing $\theta_o$. The bearing $\theta_o$ is fixed. The bearing $\theta_R$ is determined by the VHF/DF at station 1 and is maintained constant for at least one rotation of the radar antenna. The term $R_o \sin(\theta_R - \theta_o)$ is therefore determined as a number of pulses. From the equation, it is seen that $R \sin(\theta_R - \theta)$ is equal to $R_o \sin(\theta_R - \theta_o)$ and since $\theta_R$ does not vary over one rotation of the radar antenna, R varies with $\theta$. It is therefore seen that, if in a rate arithmetic multiplier, the clock frequency $f_c$ is multiplied by $\sin(\theta_R - \theta)$ for each radar pointing angle, the time in which the multiplier output provides the number of pulses equal to the count $R_o \sin(\theta_R - \theta_o)$ would be the time required for the PPI radial scan to intersect the line $V_1$ on the PPI display.

Figure 7:
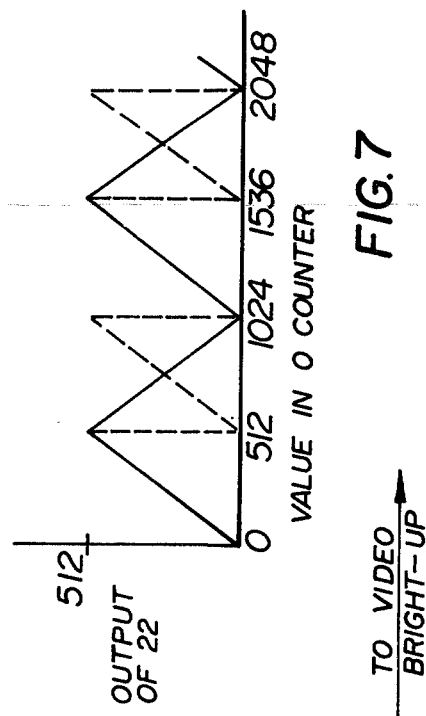
FIGS. 6 and 7 illustrate the generation of a binary signal representing bearing angles for the apparatus in FIG. 5.
Figure 6:
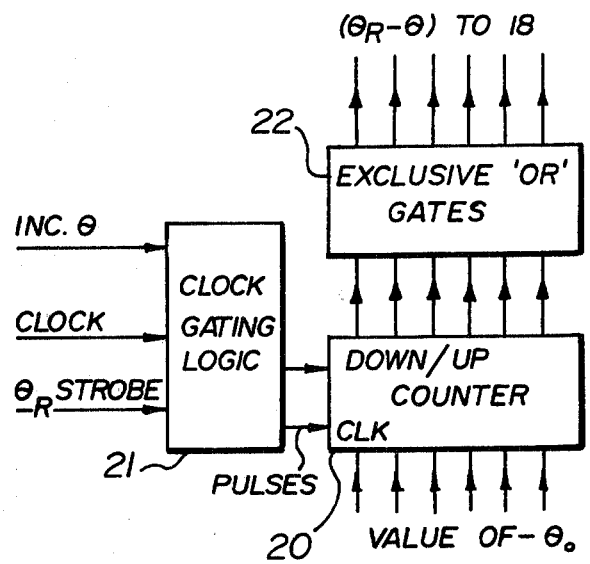

The apparatus in accordance with this invention for converting the VHF/DF bearing data $\theta_R$ to a train of pulses for forming a line on a PPI display is illustrated in FIGS. 5 to 7. The apparatus includes an up-counter 15 in which is stored the pulse count $R_o \sin(\theta_R - \theta_o)$. In response to every radar trigger pulse, the count in up-counter 15 is transferred to a down-counter 15 but is still retained in up-counter 15 until specifically changed. The input of down-counter 16 is connected to the output of a binary rate arithmetic multiplier 17 such that the output pulses from multiplier 17 operate down-counter 16 to count down to 0 at which time down-counter 16 provides an output pulse for the PPI video circuit. The inputs to multiplier 17 consist of a train of clock pulses having a repetition frequency $f_c$ and $\sin(\theta_R - \theta)$ data in binary form. The $\sin(\theta_R - \theta)$ data is received from a read-only memory 18 in which the radar pointing angle $\theta$ is up-dated for each radial scan of the PPI display.

In order to load the up-counter 15 with the count $R_o \sin(\theta_R - \theta_o)$ for each radar antenna rotation, a down-counter 19 is loaded with the count $R_o$ and at the same time up-counter 15 is cleared and enable. The clock pulses $f_c$ are applied to down-counter 19 and multiplier 17. As down-counter 19 is counting down to 0, multiplier 17 is multiplying the clock pulses by $\sin(\theta_R - \theta_o)$ received from read-only memory 18, and is providing the result to up-counter 15. When the count in down-counter 19 reaches 0, up-counter 15 is disabled and maintains its count $R_o \sin(\theta_R - \theta_o)$, which is smaller or equal to $R_o$.

The apparatus shown in FIG. 6 provides the values for $(\theta_R - \theta_o)$ and $(\theta_R - \theta)$ for memory 18. The value of the angle is stored in the $(\theta_R - \theta)$ counter 20 as a number between 0 and 2048. Input pulses to this counter can increment the value of $(\theta_R - \theta)$ in either direction, depending upon the Down/Up control. On the Load instruction, the value of negative $\theta_o$, the bearing to the remote VHF/DF 1, is entered into the counter 20. This is performed when $\theta$ equals $\theta_o$, or the radar pointing angle is the same as the remote VHF/DF base line.

A clock gating logic 21 can now gate, into the counter 20, a number of clock pulses representing $\theta_R$, the bearing read by the remote VHF/DF 1. These pulses are entered as a positive quantity. The value in the counter 20 is now $(\theta_R - \theta_o) = (\theta_R - \theta)$.

The exclusive OR gates 22 convert the format of $(\theta_R - \theta)$ to one more related to the sign and magnitude of Sine, as shown in FIG. 7. The eight least significant bits of counter 20 count up to 512 and reset to 0 at 512, 1024, 1536, and 2048. The exclusive OR gates 22 invert the binary output when $\theta$ equals 512 to 1024 and 1535 to 2048, that is, when the next most significant bit (the quadrature output) is active. The solid line shows the output of 22 against the value of the $(\theta_R - \theta)$ counter 20, while the broken line shows the value of the eight less significant bits while they are different from the output of 22.

The original number in counter 20 is $(\theta_R - \theta_o)$. When the value of $(\theta_R - \theta)$ changes from $(\theta_R - \theta_o)$, counter 20 counts up or down to have a count of $(\theta_R - \theta)$ for the current value of $\theta$. That is, the value of $(\theta_R - \theta)$ is continuously updated as the radar pointing angle changes, so that the correct value of R is determined for each radar trigger pulse.

We claim:

1. Apparatus for generating a train of pulse signals in real time for coupling to a Plan Position Indicator radar display video bright-up circuit for forming a line on the display at a bearing $\theta_R$ and passing through a point having the coordinates $R_o \angle \theta_o$ with respect to the center of the plan position indicator rotating radial scan, the radial scan operating at a radar trigger pulse repetition frequency F and rotating at a frequency f to subtend an angle $\Delta\theta = 360° \times f/F$ per scan; said apparatus comprising:

first counter means for storing a pulse count representative of $R_o \sin(\theta_R - \theta_o)$;

second counter means coupled to the first counter means and enabled at the pulse repetition frequency F to receive the pulse count from the counter means, said second counter means providing an output pulse signal for the video bright-up circuit after stepping through the pulse count; and binary rate arithmetic multiplier means having a first input for receiving clock pulses at a frequency $f_c >> F$ and a second input for receiving a digital binary signal which is a function of the radar pointing angle $\theta$ of the radial scan, the multiplier means multiplying the clock pulses of frequency $f_c$ by the digital binary signal to provide a series of timed output pulses to the second counter means for stepping the second counter means through the pulse count.

2. Apparatus as claimed in claim 1 wherein the first counter means is an up-counter means and the second counter means is a down-counter means.

3. Apparatus as claimed in claim 2 which further includes read-only memory means for storing the digital binary signal which is a function of the radar pointing angle $\theta$ in the form $\sin(\theta_R - \theta)$.

4. Apparatus as claimed in claim 3 which further includes third counter means for storing the count $R_o$, said third counter means being a down-counter means being enabled during the period that $\theta_o = \theta$ and having an input for receiving clock pulses at the frequency $f_c$ for disabling the first counter means when its count is zero thereby providing the count $R_o \sin(\theta_R - \theta_o)$ to the first counter means.

* * * * *